United States Patent
Matthews et al.

(10) Patent No.: US 9,282,022 B2
(45) Date of Patent: Mar. 8, 2016

(54) FORENSICS FOR NETWORK SWITCHING DIAGNOSIS

(71) Applicant: Broadcom Corporation, Irvine, CA (US)

(72) Inventors: William Brad Matthews, San Jose, CA (US); Bruce Hui Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 359 days.

(21) Appl. No.: 13/826,417

(22) Filed: Mar. 14, 2013

(65) Prior Publication Data

US 2014/0133314 A1    May 15, 2014

Related U.S. Application Data

(60) Provisional application No. 61/726,179, filed on Nov. 14, 2012.

(51) Int. Cl.
*H04L 12/26* (2006.01)
*H04L 12/24* (2006.01)

(52) U.S. Cl.
CPC ............ *H04L 43/50* (2013.01); *H04L 41/0672* (2013.01)

(58) Field of Classification Search
USPC .......................................... 370/244, 250, 360
See application file for complete search history.

(56) References Cited

U.S. PATENT DOCUMENTS

| | | | |
|---|---|---|---|
| 6,771,602 B1 * | 8/2004 | Benmohamed et al. | 370/232 |
| 2010/0097924 A1 * | 4/2010 | Yamaguchi et al. | 370/216 |
| 2011/0182194 A1 * | 7/2011 | Jacquet et al. | 370/252 |

* cited by examiner

*Primary Examiner* — Dang Ton
*Assistant Examiner* — Pamit Kaur
(74) *Attorney, Agent, or Firm* — Brinks Gilson & Lione

(57) ABSTRACT

A method for diagnosing performance of a network switch device includes a processor monitoring data generated by a sensor associated with a network switch device, the data related to states or attributes of the network switch device. The processor detects a determined condition in the operation of the network switch device related to the state or attribute. The processor generates an event trigger in response to detecting the determined condition and executes a forensic command in response to the event trigger. Executing the command includes sending information relevant to the determined condition for aggregation in computer storage and for analysis.

20 Claims, 5 Drawing Sheets

FORENSICS FOR NETWORK SWITCHING DIAGNOSIS

CROSS REFERENCE TO RELATED APPLICATIONS

This application claims the benefit of priority to U.S. Provisional Patent Application No. 61/726,179, filed Nov. 14, 2012, which is incorporated herein by this reference.

TECHNICAL FIELD

This disclosure relates to diagnosing network performance, and more particularly, to diagnosing and improving performance of network switch devices.

BACKGROUND

Rapid advances in electronics and communications technologies, driven by customer demand, have resulted in the widespread adoption of data-driven devices, causing a growth in network hardware and software to support ever-growing customer demand. For example, cloud computing, virtualized networks and Internet video are no longer concepts, but "must-haves." The growth in network hardware and software can include larger data centers, more servers, and more switches, hubs, routers and other network switch devices.

Customers also expect increasing speeds and higher bandwidth in access of data from any device at any time and for any application. For example, large Internet search and/or advertising companies can rely on timely delivery of information and advertising in order to monetize online business models. Requested content may be sent in varying sizes of data packets some of which can be lost or delayed in arrival during periods of data congestion.

BRIEF DESCRIPTION OF THE DRAWINGS

The systems and methods may be better understood with reference to the following drawings and description. In the figures, like reference numerals designate corresponding parts throughout the different views.

DETAILED DESCRIPTION

The discussion below makes reference to diagnosing network performance, e.g., diagnosing performance issues by obtaining forensic data from switch network device operation at selected moments in time to uncover performance anomalies. Appropriate switch visibility results from rapid analysis of the forensic data, in turn resulting in fast resolution time, e.g., faster diagnostics. The faster the switch-related forensics data is aggregated and analyzed, the faster the resolution. The quality of analytics may be enhanced if the right statistics are captured directly from the network switch devices. Accordingly, the present systems and methods provide real-time triggers for collection of forensics data across one or more network switch devices during moments of interest such as during network performance anomalies.

Network switch devices can refer to any device that can transmit and receive Ethernet packets and thus participate in networked transmission. For example, network switch devices may include, but not be limited to: switches; hubs; routers; computers; servers; mobile devices; network interface cards (NICs) and the like.

Figure 1:
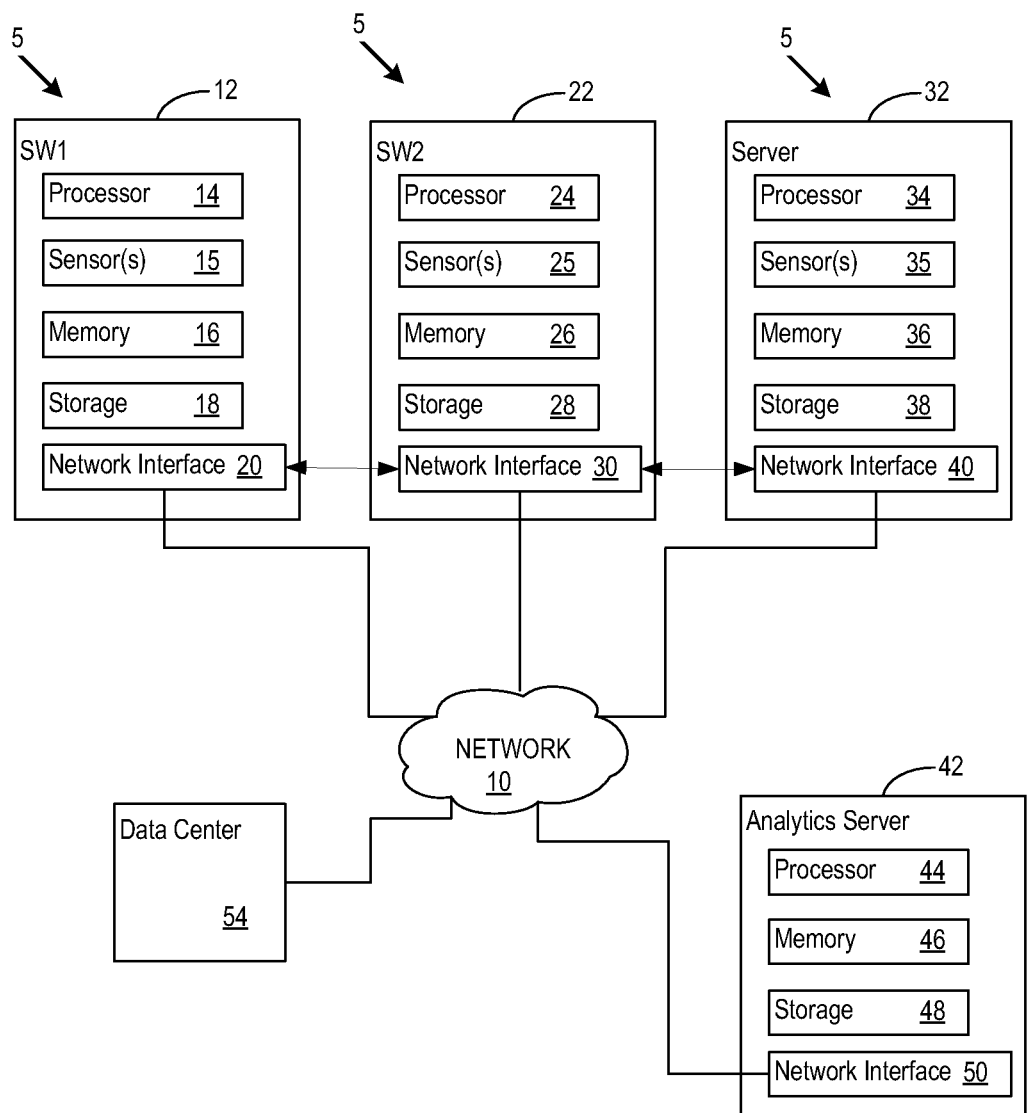
FIG. 1 is an example diagram of network switch devices that communicate over a network.

FIG. 1 is an example diagram of network switch devices 5 that intercommunicate over a network 10. The network switch devices 5 may include, for example, a first switch 12, a second switch 22 and a server 32 having switching capabilities. For simplicity, these may be referred to herein as network switch devices 12, 22 and 32. As mentioned, these network switch devices may include any network-capable device that can send and receive network packets, and so the network switch devices 12, 22 and 32 are listed for exemplary purposes only.

The first switch 12 may include a processor 14, one or more sensors 15, memory 16, storage 18 and a network interface 20. The second switch 22 may include a processor 24, one or more sensors 25, memory 26, storage 28 and network interface 30. The server 32 may include a processor 24, one or more sensors 25, memory 36, storage 38 and network interface 40. The switches 12 and 22 and the server 32 may be directly connected with networked cabling or via a wireless connection. The switches 12 and 22 and the server 32 may also be coupled with each other through the network 10. "Coupled with" herein means that components may be connected directly or indirectly through one or more intermediate components. Storage may include any kind of volatile or non-volatile memory for storing data during analysis and for future reporting purposes.

An analytics server 42 may also be coupled with the switches 12 and 22 and the server 32 through the network 10. The analytics server 42 may include a processor 44, memory 46, storage 48 and network interface 50. Any of the network switch devices 12, 22 and 32 may function as an analytics server as well, in different embodiments. A data center 54 may include one or more of the network switch devices 12, 22 and 32 and the analytics server 42, in addition to many other network switch devices 5.

The analytics server 42 may receive the forensics data from the sensors 15, 25, 35 of the network switch devices 5, aggregate the forensics data temporally, e.g., as tracked over time, and store the aggregated data in storage 48. The processor 44 may analyze the aggregated data to diagnose performance issues, and suggest adjustments to a state or attribute of a network switch device 5 to resolve or at least improve performance of the network switch device 5. Such recommendation may apply to more than one network switch device 5.

Furthermore, the analytics server 42 may generate reports or graphs for a user, which would help the user understand the operation of the network switch devices 12, 22 and 32 during network anomalies, aiding the user in diagnosing the problem with a human perspective. The functioning of the analytics server 42 may be distributed across one or more computing devices, including the network switch devices 5, which functioning will be discussed in more detail later.

Figure 2:
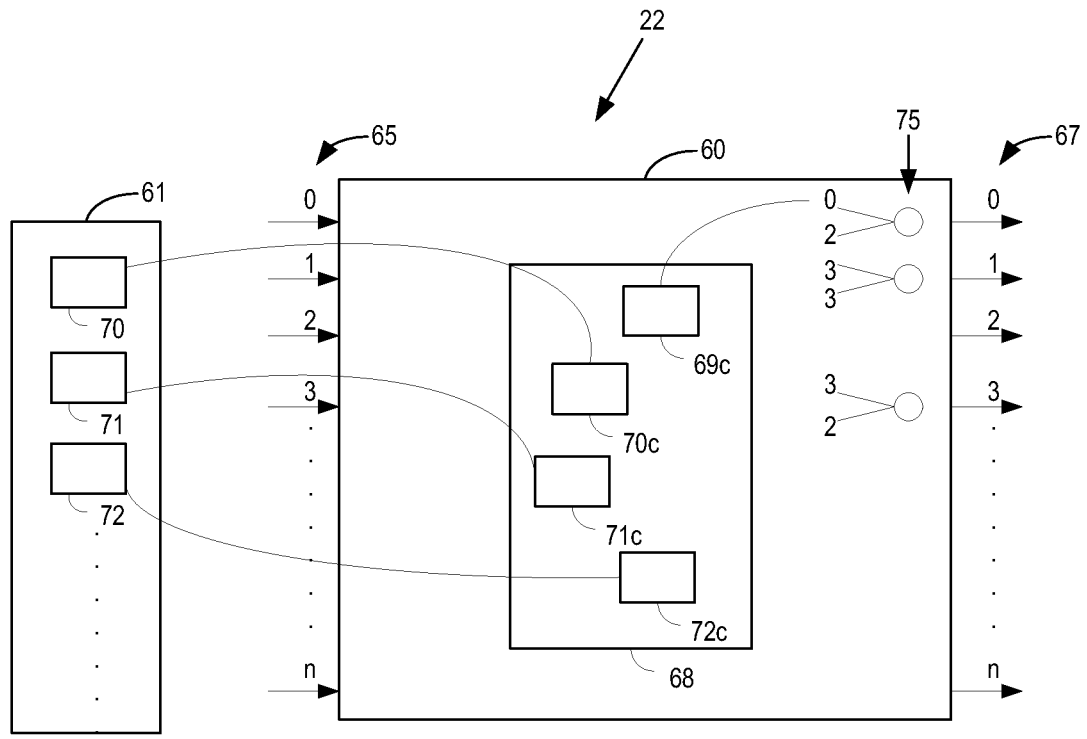
FIG. 2 is an example diagram of operation of a buffer for a network switch device such as those shown in FIG. 1.

FIG. 2 is an example diagram of operation of a buffer 60 for a network switch device such as in the network switch device 22 from FIG. 1. Data packets 70, 71 and 72 pass from an ingress queue 61 through ingress ports 65 to be stored in the buffer 60 and are eventually sent out the egress ports 67. A portion of the buffer 60 includes a shared space 68.

Figure 3:
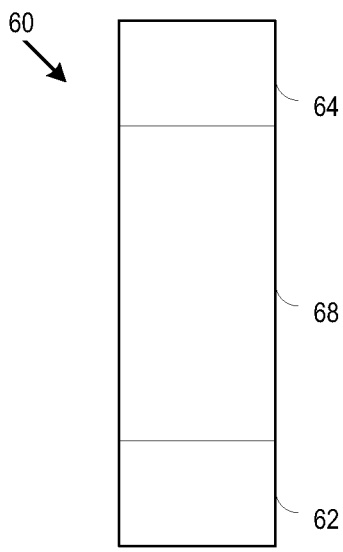
FIG. 3 is an exemplary diagram of the buffer of FIG. 2, showing buffer accounting for network switch devices.

FIG. 3 is an exemplary diagram of the buffer 60, showing buffer accounting for network switch devices 5. The allocation of buffer space starts by setting a minimum reserve to each of multiple ingress ports 65 that will be used first. The allocation, for example, could be set to 10 kilobyte (KB) or 100 KB (or some other value) per ingress port 65, the sum of which makes up the minimum reserve 62 shown in FIG. 3. The minimum reserve 62 need not be in contiguous space and is depicted as a block of memory for simplicity of explanation. Next, a user sets a headroom reserve 64 according to expected influx of data that would demand instantly-fillable space. What remains after the minimum reserve 62 and the headroom reserve 64 is allocated as shared space 68 that can be filled after the minimum reserve 62 is full, in the normal course of operation.

For purposes of discussion and with further reference to FIG. 2, assume the first network switch device 12 sent the packets 70, 71 and 72 that are leaving the ingress queue 61 and entering the buffer 60 of the second switching device 22, a linking partner to the first network switch device 12. Assuming that the minimum reserve 62 is already full, the packets 70, 71 and 72 are stored in corresponding cells $70c$, $71c$ and $72c$ in the shared space 68 of the buffer 60. A data packet had already been stored in cell $69c$ of the shared space 68.

Each data packet can vary in size, but the cells are usually fixed at a specified memory cell size. Accordingly, the buffer 62 can be most-efficiently filled if the majority of the packets fit exactly within a cell in the buffer, 128 bytes for example for purposes of discussion. Logic executable by the processor 24 and stored in the memory 26 and/or storage 28 links incoming packets to respective cells in the buffer 60 through the ingress ports 65, including where to store overflow in the shared space 68 and whether to use the headroom reserve 84. Additional logic combines the data packets from different cells of the buffer 60 into an out-going, or egress queue 75 that feeds the egress ports 67 for transmission. The logic maps combinations of the ingress ports that are being passed to the egress ports through the egress queue 75.

During operation, the network switch device 22 may begin to receive incoming packets on the ingress ports 65 at a faster rate than it is sending outgoing packets on the egress ports 67 (e.g., at a two-to-one ratio) that the buffer 60 quickly fills up and the switching device cannot handle all the data. The switching device 22 becomes congested and executes flow control logic to determine how to resolve the congestion. Two of the standard methods are pause and priority flow control (PFC). The switching device 22 executes one of these methods (or other flow control logic) and decides to pause flow control or to execute PFC, where PFC provides priority to certain groups or types of data packets. The switching device 22 then generates a message, which is transmitted to a link partner such as the switching device 12, telling the switching device 12 to stop sending packets. The link partner switching device 12 receives the message, executes the message and finally stops sending packets to the switching device 22 so that flow control can begin, if being used.

This process clearly involves a delay from the point the switching device 22 decides to execute flow control to the point the link partner switching device 12 stops sending packets to the switching device 22. During this time delay, the buffer 62 of the switching device 22 continues to fill up. The headroom reserve 64 is intended to handle these quick influxes of data, also referred to as inflight data, and to continue buffering long enough to get data packet flow stopped. The ability to resolve congestion without losing packets drives buffer requirements. The more shared space that is available, the more traffic the switching device can handle before entering into flow control. But, if that leaves insufficient headroom reserve, there is a higher likelihood of losing packets when flow control is executed. Accordingly, configuring reserve and shared space in a buffer is driven by expected normal demand for buffer storage and expected influx demand during a typical flow control event.

Often, switch devices are configured for the worst-case scenario, and thus the headroom reserve is over-allocated to prevent packet loss, at the expense of having a larger shared space 68, which would reduce the instances where flow control is needed. There are many dynamics in calculating what inflight data might be during a congestion scenario as just described. For example, some of the packets may be 129 bytes and thus consume two 128-byte-sized cells for each of those packets. Furthermore, the switching device 12 does not stop transmitting a packet midstream and if the switching device 12 just begins transmitting a jumbo (or very large) packet right before priority flow control is initiated by the switching device 22, the inflight data may be quite large. A combination of these dynamics may create a worst-case scenario. Statistically, the worst-case scenario is very unlikely to ever occur.

Figure 4:
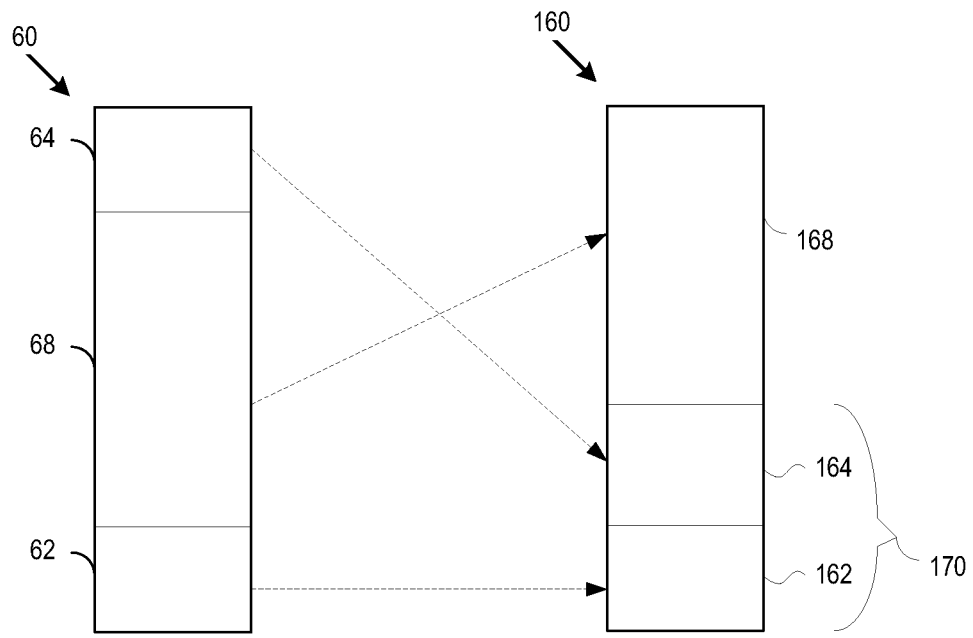
FIG. 4 is an exemplary diagram showing buffer accounting versus a reserve-share buffer for network switch devices.

Nevertheless, the worst-case scenario has historically driven customers to allocate more headroom reserve 64 than will be statistically needed, to prevent packet loss if the worst-case scenario occurred. FIG. 4 is an exemplary diagram showing buffer accounting versus a reserve-share buffer for network switch devices. The customer re-organizes a reserve 170 allocation as a combination of a minimum reserve 162 and a headroom reserve 164, and calculates what that combined reserve 170 should be. A shared space 168 is then what remains.

Figure 5:
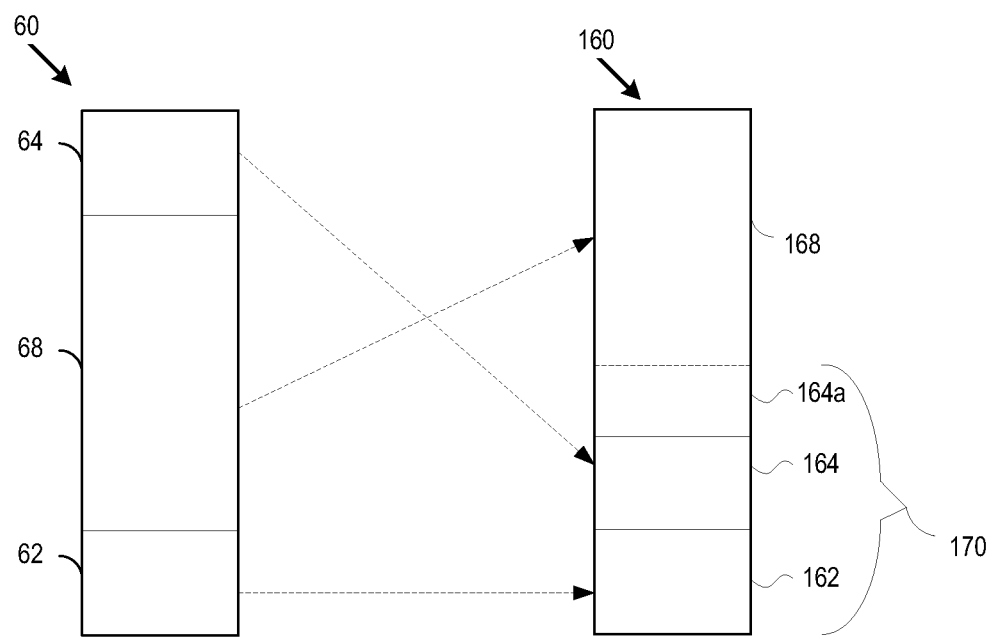
FIG. 5 is the diagram of the buffers of FIG. 4, showing an exemplary reconfiguration of shared memory versus the reserved memory in the reserve-share buffer.

To reduce reserve costs, the customer could, however, reconfigure or reallocate memory of the buffer 60 as shown in FIG. 5. The shared space 168 may be calculated as being larger than the total buffer size minus the combination of the minimum and headroom reserves 162 and 164 ("total reserve" 170). In the allocation of FIG. 5, therefore, an over-subscribed reserve portion $164a$ exists that would eat into the shared space 168 if needed for flow control during a congestion event, for example.

A customer can, however, increase the shared space 168 with a minimal or zero impact to operation of the total reserve 170 allocation of the buffer 160. To do so, customers are provided monitoring capability through the sensors 15, 25, 35 that enable observing usage over time of total reverse, headroom and minimum reserve memory spaces. The customer may still configure per port reserve to cover a worst-case amount where the expectation is that all ports should not use the entire port reserve simultaneously. The maximum reserve used during operation as observed during monitoring should be sufficient for customer networks. A customer can then reclaim total reserve space by configuring shared space to be the total buffer size minus the maximum observed reserve used.

The customer may also set a global threshold that limits the maximum amount of the buffer that can be used for headroom. This global threshold may only be applied when the total headroom consumed by all ingress ports exceeds the configured value, e.g., the expected headroom used. When the headroom amount exceeds this configured value upon packet arrival, the packet is dropped. Dropping a packet should be a rare event and is primarily used to protect against allocating minimum guarantees of buffer access provided to ports.

Figure 6:
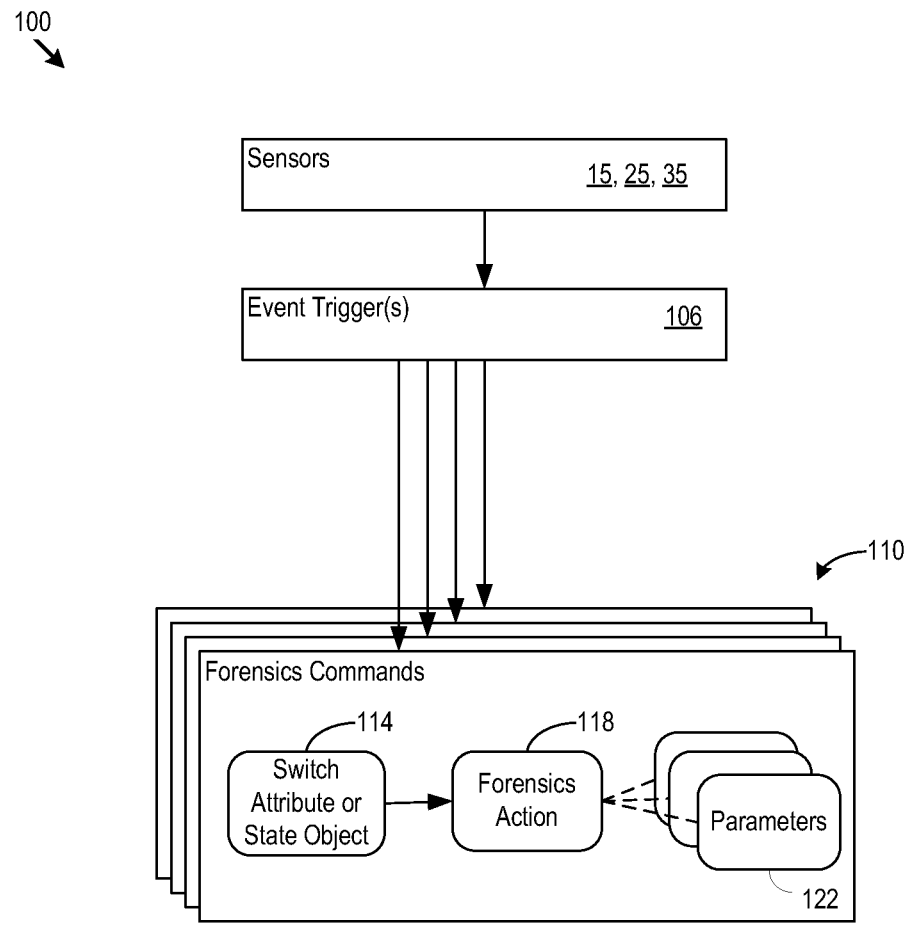
FIG. 6 is an example diagram of a forensics dataflow with reference to network switch devices such as those shown in FIG. 1.

FIG. 6 is an example diagram 100 of a forensics dataflow with reference to the network switch devices 12, 22 and 32. At least one processor from FIG. 1 gathers data from the sensors 15, 25, 35 that provide information on states and/or health attributes of network switch devices. Device states include, but are not limited to: buffer fill level; queue length; power consumption; specific flows (such as abnormally large packet transmissions); and delay(s) such as average delay for a packet through a switching device. Device attributes include, but are not limited to: temperature; link state; congestion and the like. The network switch devices 5 or the analytics server 42, in monitoring the forensics data, may generate multiple event triggers 106 corresponding to detected conditions in the state(s) or attribute(s). In response to the triggers, the at least one processor executes sophisticated forensics commands 110, each of which includes an object 114 with information about the attribute or state, a forensics action 118 and one or more parameters 122. The attribute or state information 114 may be packaged into an object or data package integrated within the command.

Alternatively, issuance of a trigger event may automatically generate an informational packet like the data package or object that may be aggregated with similar informational packets in computer storage for purposes of analysis and diagnosis of a condition.

Triggers are configured to alert a customer when a network anomaly has occurred. In other words, event triggers are generated when one or more conditions are met with reference to a state or attribute of a network switch device or multiple switch devices. Conditions may be configured utilizing sensor attributes. Multiple conditions may need to be met before a trigger can issue to cause a forensics command to be executed. Additionally, a single condition may be the source for multiple triggers. Examples of triggers may include, but are not limited to: packet discard; power consumption being greater than a determined consumption level; and a buffer fill level being greater than a determined level Forensics commands are executed to enable rapid drill down to the information or data that has been gathered, to provide rich contextual information specific to network events. Forensics commands digest and present the data for diagnosis of network anomalies tied to the network switch devices 5. A single trigger may result in multiple commands. Some commands may send an interrupt or flag in response to which the at least one processor generates a message to the customer or user, viewable at the analytics server 42, for example.

More specifically, each command is contextual, including an action and arguments constructed as an output such that the command provides the maximum amount of information relevant to the network anomaly. The forensics action 118 may include the generation of a report for the customer or sending an informational packet to the analytics server 42. Aggregation of forensics commands over time may generate a diagnosis of the network anomaly, or at least a cogent report of granular data presentable to the customer for human diagnosis.

The parameter(s) 122 apply constraints to the action and/or specify a target to which results of the action are to be sent. Accordingly, the parameters 122 may include restrictions to reporting on data only on queues numbered 1, 3 and 5 or on the entire buffer or only for ports numbered 1 through 4, for example. Furthermore, the parameters also may include a target to which the informational packet generated by command execution is being sent, e.g., a media access control (MAC) address of the analytics server 42 for a particular customer.

Attributes of a network switch device 5 may include any packet that arrives and is counted as reserve, either as minimum or headroom reserve 162 or 164. As another example, headroom use can be monitored so that any packet saved in headroom reserve is counted and tracked over time. As yet another example, minimum reserve use can be monitored so that any packet saved in minimum reserve is counted and tracked over time. In these examples, the packets stored as reserve, in headroom or in minimum reserve, may be tracked at a granularity of per service pool or per ingress port.

If shared space 168 is depleted and reserve space 170 used exceeds the configured maximum observed amount, then the following behavior will likely be observed. A minimum per port reserve may be compromised such that a port may unexpectedly be starved in terms of access to the buffer 160. Packet loss may also occur due to lack of headroom reserve 164.

Compromises commonly occur when certain packet sequences occur: sequences of data packets rely on a combination of large and small packets. The network switch device (s), with sensors, may provide a data sender packet size histogram to provide confidence to a customer that problematic events are unlikely to occur. A counter can be provided for each packet size, where the counter is incremented on every packet arrival, depending on customer or user configuration. Every packet that arrives to a specified ingress port will get counted with granularity at the network switch device level.

One benefit of increasing the available shared space 168 is that flow control events are less frequent and of shorter duration. To quantify these gains, the network switch device may track accumulated count of flow control events and total flow control duration.

Flow control events can trigger an event at transmission of XOFF, a stop transmitting signal, via PFC or pause flow control methods. The flow control events may be tracked at a per-device granularity or at lower granularities such as per-input port, per-priority group or even at per-priority or per-flow levels of granularities.

Duration of flow control events may be updated when: (i) a count is started with a transmission of an XOFF signal via PFC or pause methods; (ii) a count is stopped with an XON signal (a begin transmitting signal) via PFC or pause methods; and/or (iii) a clear count is begun upon issuance of an XOFF through any other flow control method. Tracking duration of flow control may be at a per-input port or priority group level of granularity.

Users or customers may reclaim substantial amount of shared buffer space not normally used (because of over-allocation to reserve space) depending on the network and the real-time dynamics of how the shared buffer space is used, which was previously discussed. Reclaimed buffer space results in both an increase in burst (or influx) of packet absorption and in reduced flow control events. Monitoring tools may quantify advantages and build confidence into using solutions that will not appreciably increase likelihoods of packet loss.

In a further example, generating and monitoring forensics data from network switch devices may provide visibility as to the cause of packet discards. Packet discards in the data center 54 impacts system throughput and application performance due to the high cost of transmission control protocol (TCP) retransmission time out (RTO).

Delays associated with discards leads to loss of revenue in private clouds. Data mining capabilities associated with generations of advertisements is reduced as delay increases. Until now, there have existed limited capabilities for determining why discards occur. Information that has been available includes the number of discards and which queue or port caused the discard.

Switch forensics can help operators identify the source of discards by providing deep insight into the cause of packet discards. Forensic commands executed by triggers, including the actual packet discards, provide a view of the port, the queue and other aspects of the network switch devices at the time of the discards. This allows customers or users to go back in time and review the state of the switch at the time of the discards.

When a packet arrives at the egress queue (e.g., port 0, queue 0) and is discarded, an event occurs. The packet may be discarded because queue length exceeds a user-defined limit. The switch sensors 15, 25, 35 monitor egress queue/port consumption of the buffer 60 or 160. An egress queue discard threshold may trigger both a packet discard and multiple forensic commands.

By way of a first example, packet forensics commands, in response to discards, may include a snapshot size of total buffer and all queues, in report form sent to the analytics server 42 or some other computer. This forensics command provides insight into the state of the buffer 160 at the time of the discard event. The queue thresholds are dynamic and change as a function of buffer consumption, so a snapshot in time allows proper insight into contributory factors of the discard event.

By way of a second example, another forensics command generates statistics collection on all existing packets in the queue 61 or 75. If a packet destined for a queue is dropped, a customer would like to know the contents of the queue to determine which flows were active and using the queue when the drop occurred. These sets of commands enable rapid and thorough understanding of the reasons for the discard event.

Accordingly, obtaining the appropriate network visibility at the right moment in time through generating forensic commands based on conditional triggers enables rapid drill down analysis and fast diagnosis of network switching issues. The most relevant data is provided to a computer system or user via contextual commands that enables informative reporting that provides or helps with diagnosis. The analytic information is generated by the network switch devices when anomalies occur. As a result, data packet traces performed by edge servers such as Wireshark traces are not needed. The data is also not reliant on intermediate network appliances and the triggering and commands may lead to local or distributed analysis and report generation that provides forensics intelligence in a timely and nimble manner.

Figure 7:
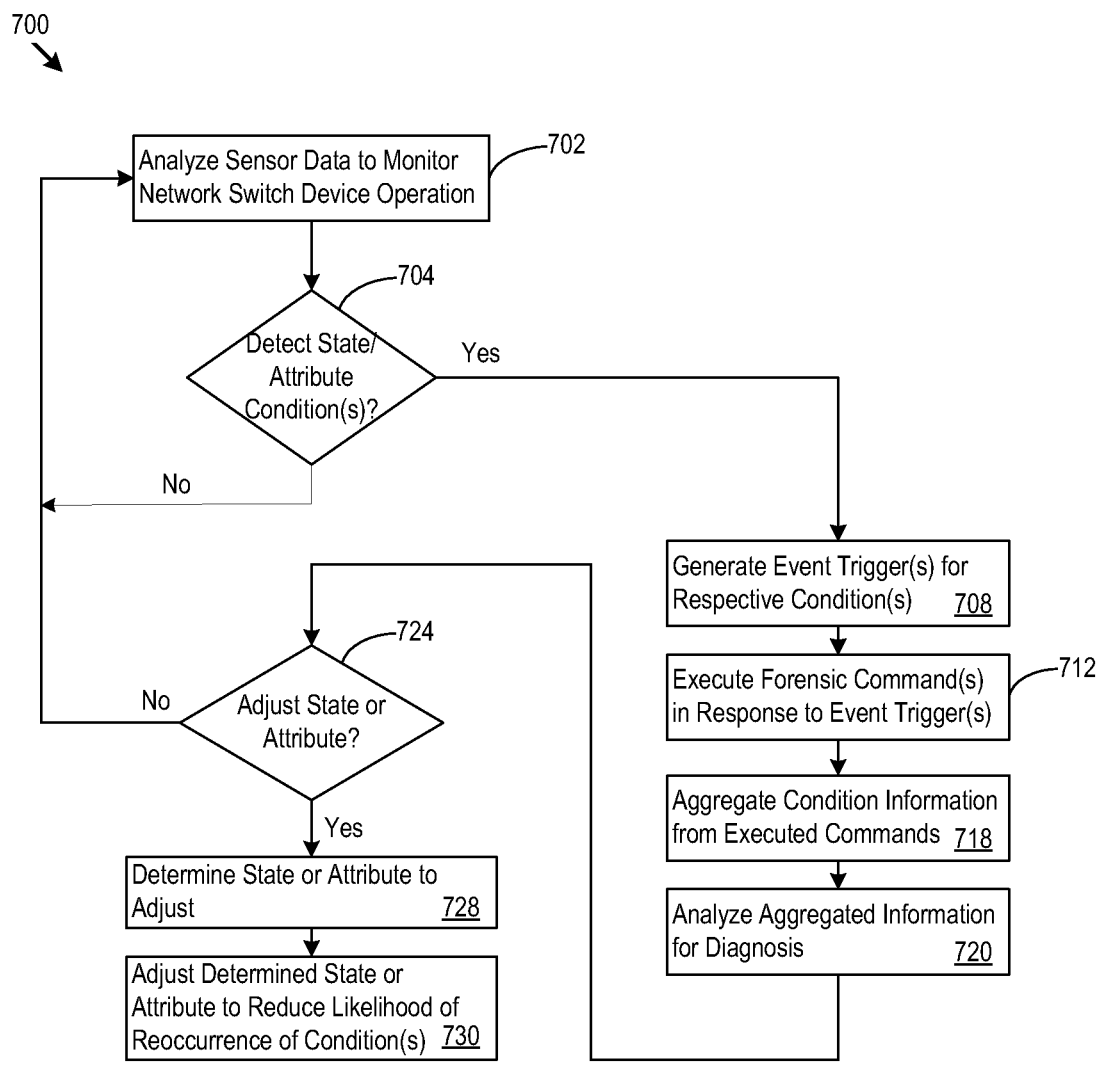
FIG. 7 is an example flow chart of a method for diagnosing and adjusting performance of network switch devices based on forensic data gathered from operation of the network switch devices.

FIG. 7 is an example flow chart 700 of a method for diagnosing and adjusting performance of network switch devices 5 based on forensic data gathered from operation of the network switch devices. At least one processor from FIG. 1 analyzes sensor data to monitor network switch operation of the network switch devices (702). The at least one processor detects a determined condition in the operation of at least one of the network switch devices related to the state or attribute (704); otherwise, the at least one processor continues to analyze sensor data in monitoring network switch device operation (702). The at least one processor generates one or more event triggers in response to detecting the determined condition (708).

The at least one processor executes a forensic command in response to the one or more event triggers (712). The at least one processor aggregates information in the computer storage related to conditions gathered from executed commands (718) and analyzes the aggregated information for diagnostics purposes, e.g., to determine a cause of the conditions (720). The at least one processor may adjust a state or attribute (724) by determining which state or attribute may remedy the determined condition (728). Once determined, the at least one processor may adjust the determined state or attribute to reduce the likelihood of reoccurrence of the determined condition (730). For example, adjusting relative amounts of shared and reserved space to increase the amount of shared space in a buffer of a network switch device may reduce the number and length of flow control events. Furthermore, adjusting the queue length of an egress queue of network switch device may reduce the number of packet discard events.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system, comprising:
   memory;
   a sensor coupled with network switch circuitry, the sensor configured to generate data related to a switch attribute of the network switch circuitry; and
   a processor coupled to the sensor and the memory, the processor configured to:
      analyze the data from the sensor to monitor operation of the network switch circuitry for a determined condition of the switch attribute of the network switch circuitry;
      detect the determined condition of the switch attribute during the operation of the network switch circuitry;
      generate an informational packet responsive to detecting the determined condition, the informational packet including information on the determined condition;
      generate an informational packet aggregate by grouping the informational packet with a selected additional informational packet already present in the memory;
      using the informational packet aggregate as an input, track the determined condition over time; and
      analyze the determined condition over time to diagnose a cause of the determined condition.

2. The system of claim 1, where the processor is further configured to adjust the switch attribute to reduce a likelihood of reoccurrence of the determined condition by adjusting an operational range of the switch attribute.

3. The system of claim 1, where the processor is further configured to adjust the switch attribute to reduce a likelihood of reoccurrence of the determined condition by adjusting a ratio of shared space to reserved space in a buffer.

4. The system of claim 1, where:
   the determined condition is one of multiple determined conditions; and
   the processor is configured to:

generate a performance report for the network switch circuitry responsive to the multiple determined conditions; and
send the performance report to a terminal for presentation to an operator.

5. The system of claim 1, where the processor is further configured to execute a forensic command in response to the determined condition, where executing the command causes generation of the informational packet.

6. The system of claim 1, where the processor is further configured to send the informational packet to a specified target for receipt.

7. The system of claim 1, where the switch attribute comprises: buffer fill level, buffer counter, power consumption, queue length, temperature, flow identifier, delay, link state, level of congestion, or any combination thereof.

8. The system of claim 1, where the determined condition comprises: a packet discard, power consumption greater than a determined consumption level, a buffer fill level above a determined level, or any combination thereof.

9. The system of claim 1, where the informational packet includes a size snapshot comprising a measured memory level for a buffer, a queue, or both.

10. A method, comprising:
monitoring, at a processor, data generated by a sensor coupled to a network switch circuitry;
generating a size snapshot for a buffer of the network switch circuitry, a queue of the network switch circuitry, or both;
detecting a discard threshold crossing for the buffer, the queue, or both responsive to the data;
generating an event trigger packet comprising the size snapshot in response to detecting the discard threshold crossing; and
sending the event trigger packet to a determined storage location to generate aggregated data on the discard threshold crossing for analysis of the discard threshold crossing over time to diagnose a cause of the discard threshold crossing.

11. The method of claim 10, further comprising adjusting an allocation of space in the buffer of the network switch circuitry responsive to an observed average use of reserve space in the buffer, shared space in the buffer, or both.

12. The method of claim 10, further comprising:
adjusting an operational parameter of the network switch circuitry to reduce a likelihood of reoccurrence of the discard threshold crossing.

13. The method of claim 10, wherein generating the size snapshot comprises generating, at the time of the discard threshold crossing, size snapshots for multiple buffers, multiple queues, or both.

14. The method of claim 10, further comprising adjusting a queue length of the queue of the network switch circuitry responsive to the size snapshot.

15. The method of claim 10, where sending the event trigger packet comprises sending the event trigger packet to a determined media access control (MAC) layer address for aggregation.

16. A method comprising:
monitoring data generated by a network switch circuitry of a network, the data characterizing an attribute of the network switch circuitry;
establishing a set of predetermined operating conditions for which to detect in the network switch circuitry;
detecting a specific operating condition among the set of predetermined operating conditions that exists at a given time in the network switch circuitry by analyzing the data;
generating, via a processor, an event trigger;
in response to the event trigger, generating an informational packet including information characterizing the specific operating condition;
generating an aggregate of informational packets by sending the informational packet to a specific address designated for the specific operating condition, the aggregate comprising data tracking the specific operating condition over time;
analyzing the data tracking the specific operating condition over time to produce a diagnosis of a cause of the specific operating condition; and
adjusting the attribute responsive to the diagnosis to reduce a likelihood of reoccurrence of the specific operating condition.

17. The method of claim 16, where the specific address comprises a pre-determined media access control (MAC) layer address of a device assigned to generate the aggregate.

18. The method of claim 16, where adjusting comprises:
adjusting reserve buffer space, shared buffer space or both in the network switch circuitry.

19. The method of claim 16, where monitoring comprises:
monitoring buffer fill level, queue length, power consumption, flow identifier, delay, temperature, port link state, queue link state, congestion level, or any combination thereof.

20. The method of claim 16, where the specific operating condition comprises:
a packet discard, power consumption greater than a determined consumption level, a buffer fill level above a determined level, or any combination thereof.

* * * * *